United States Patent Office 3,334,979
Patented Aug. 8, 1967

3,334,979
METHOD OF MAKING A DIHYDRATE AND ANHYDROUS MIXTURE OF DICALCIUM ORTHOPHOSPHATE DENTIFRICE ABRASIVE
Elerington Saunders, Marblehead, Mass., and Thomas Schiff, St. Louis, Mo., assignors to Monsanto Company, St. Louis, Mo., a corporation of Delaware
No Drawing. Filed Apr. 20, 1965, Ser. No. 449,627
2 Claims. (Cl. 51—307)

This is a continuation-in-part of United States patent application Ser. No. 281,041, filed May 16, 1963.

The present invention relates to novel dentifrice abrasives and to novel dentifrice compositions that contain these abrasives.

Dicalcium orthophosphate dihydrate ($CaHPO_4 \cdot 2H_2O$), including dicalcium phosphane dihydrate that has been stabilized against spontaneous dehydration with a small amount of tetrasodium pyrophosphate in accordance with processes such as those described by Moss et al. in United States Patent 2,287,699 or with trimagnesium orthophosphate and the like, has been utilized in dental preparations for many years. While this material has great utility as a dentifrice abrasive in toothpastes and tooth powders, for example, it is, nevertheless, a fairly "soft" abrasive material; that is, it generally does not have a very high degree of abrasiveness. Thus, in order to clean teeth that are very heavily coated with discoloring material, food particles, tartar, etc., a considerable expenditure of time and energy must usually be applied to the tooth brush if the dentifrice composition utilized therewith contains dicalcium orthophosphate as its sole abrasive.

It has now been found that the abrasive and polishing (lustre-forming) ability of dicalcium orthophosphate dihydrate can be improved to a surprising degree by the inclusion in the dentifrice compositions of a minor amount of a certain form of anhydrous dicalcium orthophosphate ($CaHPO_4$); i.e., precipitated anhydrous dicalcium orthophosphate. Precipitated anhydrous dicalcium orthophosphate is to be distinguished herein from anhydrous dicalcium orthophosphate that has been prepared by dehydrating dicalcium orthophosphate that was originally prepared in the form of the dihydrate ($CaHPO_4 \cdot 2H_2O$). Such a distinction can readily be made because precipitated anhydrous dicalcium orthophosphate is significantly more abrasive than is the anhydrous dicalcium orthophosphate material made by dehydrating dicalcium orthosphosphate dihydrate, although from all outward appearances, these two types of anhydrous dicalcium orthophosphate are identical. Relatively pure precipitated anhydrous dicalcium orthophosphate has a "dentin abrasion value" (defined in the discussion following Example I, below) of about 1000, while the material prepared by dehydrating dicalcium orthophosphate dihydrate has a "dentin abrasion value" in same test of only about 300. The term "precipitated anhydrous dicalcium orthophosphate" means the dicalcium orthophosphate that is precipitated in that (anhydrous) form from a slurry or solution of a mixture of lime and orthophosphoric acid. The reaction of orthophosphoric acid and lime in the preparation of dicalcium orthophosphates is well-known in the art and need not be detailed here, except to point out that generally when the temperature of the reaction mixture (of acid and lime) is maintained above about 40° C. during the precipitation of the dicalcium orthophosphate, the precipitated anhydrous dicalcium orthophosphate to which the present invention relates is produced, while at reaction temperatures below about 40° C., dicalcium orthophosphate dihydrate is produced.

Thus, it has also been discovered that the valuable dentifrice abrasive compositions of this invention can be manufactured "in situ," by maintaining the temperature of the appropriate reaction mixtures (water, orthophosphoric acid, and lime in the form of fluid aqueous slurries) above about 40° C. for a period of time during the reaction of the orthophosphoric acid with the lime sufficient to enable from about 2 to about 20, and preferably from about 5 to about 10 weight percent of the orthophosphoric acid to form the desired precipitated anhydrous dicalcium orthophosphate, and conducting the remainder of the reaction at temperatures below about 40° C. to thereby form dicalcium orthophosphate dihydrate in a conventional fashion. The "higher temperature" (above about 40° C. to form the precipitated anhydrous dicalcium orthophosphate) portion (or portions) of this process can be advantageously undertaken at any time during the overall reaction (of $H_3PO_4$ with lime) period.

The term "lime" as used herein is intended to encompass all of those basic calcium-containing materials that can be reacted with dilute aqueous solutions of orthophosphoric acid to yield dicalcium orthophosphate. Thus, the term encompasses calcium carbonate, calcium oxide, calcium hydroxide, and mixtures thereof; including mixtures commonly called "slaked lime," "quicklime," and "hydrated lime."

Generally, the amount of precipitated anhydrous dicalcium orthophosphate that should be utilized in conjunction with dicalcium orthophosphate dihydrate in the practice of this invention is from about 2 to about 20 weight percent, but is preferably from about 5 to about 10 weight percent of the precipitated anhydrous material, based on the total weight of dicalcium orthophosphate in the dentifrice abrasive mixture.

The dentifrice abrasive mixtures or blends of the present invention can be prepared in any of a number of ways. For example, they can be prepared by simply mechanically intermixing appropriate amounts of dicalcium orthophosphate dihydrate with precipitated anhydrous dicalcium orthophosphate. Also, the mixtures of this invention can be manufactured essentially in situ by simply precipitating the dicalcium orthophosphate (from the reaction of orthophosphate and $CaCO_3$ or lime) under closely controlled conditions (for example, at a temperature very close to or slightly above about 40° C. during at least part of the reaction) so that the desired blend of dihydrated and "precipitated" anhydrous dicalcium orthophosphates is produced directly in the precipitation process itself.

In the formulation of finished dentrifrice compositions containing the dicalcium orthophosphate mixtures of this invention practically any of the auxiliary agents that are conventionally utilized in toothpaste and/or tooth powder compositions can be used in conjunction with these novel compositions. Toothpastes, for example, will generally contain a sweetner such as saccharin a humectant such as sorbitol or glycerin; a binding agent such as gum tragacanth, Irish moss extract, hydroxyethylcellulose, carboxymethylcellulose and the very high molecular weight polyethylene oxides; a sudsing agent such as sodium lauryl sulfate, sucrose monolaurate or tridecyl alcohol that has been reacted with from about 3 to about 10 moles of ethylene oxide per mole of alcohol and a flavoring agent.

In toothpastes, the level of the dicalcium orthophosphate mixtures of the present invention that is utilized can generally be varied from about 20 to about 60 weight percent, and preferably from about 30 to about 45 weight percent of the composition. These novel dicalcium orthophosphate mixtures need not be the only abrasive materials in the dentifrice composition, although it is generally preferred that they represent at least about half of all of the abrasive materials in the dentifrice compositions. In tooth powders, generally higher amounts of these novel abrasive mixtures, often up to about 95 weight percent, can be utilized.

In the following examples, which are illustrative of some of the preferred embodiments of the present invention, all parts are by weight unless otherwise specified.

EXAMPLE

Into a conventional stainless steel powder blending vessel are poured 92,000 parts of −200 dicalcium orthophosphate dihydrate which has been stabilized with a small amount of tetrasodium pyrophosphate and 8000 parts of −200 mesh anyhdrous dicalcium orthophosphate which had been precipitated in the anhydrous forms by reacting a dilute lime slurry with orthophosphoric acid at a temperature of about 60° C. The resulting mixture is then blended for a period of 1 hour. At the end of this time, it has been converted to a uniform blend containing 92 weight percent of dicalcium orthophosphate and 8 weight percent of precipitated anhydrous dicalcium orthophosphate.

This blend is then incorporated into a toothpaste composition in the following manner ("heated procedure"):

A powder phase is prepared by intermixing 50 parts of the dentifrice abrasive composition prepared in accordance with the above-described procedure, 2.1 parts of sodium lauryl sulfate, and 2 parts of gum tragacanth. This mixture is then warmed to about 90° C. Into the resulting mixture of powders is poured slowly, with continuous agitation, an elixer containing a blend of 14 parts of glycerine, 5 parts of sorbitol, 0.1 part of saccharin, and 24 parts of water. The resulting mixture is then stirred continuously for about 2 hours until the mixture has cooled to about 30° C.

Conventional "cool" methods or procedures for utilization of the dentifrice abrasive mixtures of the present invention in the preparation of toothpastes can also be practiced advantageously and without any particular difficulties.

The resulting toothpaste is evaluated for abrasiveness by the procedure of Grabenstetter et al. in the Journal of Dental Research, volume 17, Number 6, November–December, 1958, pp. 1060–1068; wherein "dentin abrasion values" are assigned after a dentifrice composition has been utilized in the mechanical brushing of radioactive dentin from extracted human teeth. Generally, it is preferred that the "dentin abrasion value" of a given dentifrice composition be within the range of from about 300 to about 700. In the present Example I, the "dentin abrasion value" of the toothpaste was found to be about 450, a figure that is considerably higher than that which would ordinarily be expected from the "dentin abrasion values" of similar toothpastes made using solely the dicalcium orthophosphate dihydrate and the precipitated anhydrous dicalcium orthophosphate, which were 200 and 1000, respectively.

What is claimed is:

1. A process for manufatcuring a dicalcium orthophosphate dentifrice abrasive which comprises (a) initially intermixing lime and orthophosphoric acid in an aqueous medium having a temperature above about 40° C. to form reaction mixtures in the form of an aqueous slurry consisting essentially of lime orthophosphoric acid and water; (b) maintaining the temperature of the resulting slurry above about 40° C. until from about 2 to about 20 weight percent of said orthophosphoric acid has been converted to precipitated anhydrous dicalcium orthophosphate; (c) thereafter lowering the temperature of said slurry to below about 40° C. and (d) then maintaining the temperature of said slurry below about 40° C. until the remainder of said orthophosphoric acid has reacted with lime to produce dicalcium orthophosphate dihydrate the resultant mixture of said orthophosphate dihydrate and said precipitated anhydrous orthophosphate being characterized by having a dentin abrasion value of about 300 to about 700.

2. A process for manufacturing a dicalcium orthophosphate dentifrice abrasive which process comprises reacting together in an aqueous medium having a temperature below about 40° C. orthophosphoric acid and lime to form reaction mixtures in the form of an aqueous slurry consisting essentially of lime, orthophosphoric acid and water, increasing the temperature of said slurry to above about 40° C. after from about 80 to about 98 weight percent of said orthophosphoric acid has been converted to dicalcium orthophosphate dihydrate and thereafter maintaining the temperature of said slurry above about 40° C. until the remainder of said orthophosphoric acid has reacted with lime to thereby form precipitated anhydrous dicalcium orthophosphate; the resulting dicalcium orthophosphate dentifrice abrasive consisting essentially of from about 80 to about 98 weight percent of dicalcium orthophosphate dihydrate and from about 2 to about 20 weight percent of precipitated anhydrous dicalcium orthophosphate, said resulting dentifrice abrasive being further characterized by having a dentin abrasion value of above 300 to about 700.

References Cited

UNITED STATES PATENTS

| | | | |
|---|---|---|---|
| 2,296,494 | 9/1942 | Block | 23—109 |
| 3,012,852 | 12/1961 | Nelson | 23—109 |
| 3,065,053 | 11/1962 | Aia | 23—109 |
| 3,112,247 | 11/1963 | Schweizer | 167—93 |
| 3,236,693 | 2/1966 | Hartmann et al. | 23—109 |

ALEXANDER H. BRODMERKEL, *Primary Examiner.*

D. J. ARNOLD, *Assistant Examiner.*